United States Patent
Fischer et al.

[11] Patent Number: 5,878,716
[45] Date of Patent: Mar. 9, 1999

[54] PROCESS AND DEVICE FOR CONTROLLING AN INJECTION ACTUATOR

[75] Inventors: Werner Fischer, Heimsheim; Kai-Lars Barbehoen, Ludwigsburg, both of Germany

[73] Assignee: Robert Bosch GmbH, Stuttgart, Germany

[21] Appl. No.: 948,686

[22] Filed: Oct. 10, 1997

[30] Foreign Application Priority Data

Oct. 16, 1996 [DE] Germany .................. 196 42 671.5

[51] Int. Cl.⁶ ............................................. F02D 31/00
[52] U.S. Cl. ................................................ 123/357
[58] Field of Search .................... 123/357, 358, 123/500–501

[56] References Cited

U.S. PATENT DOCUMENTS

| | | |
|---|---|---|
| 4,019,478 | 4/1977 | Hobo et al. . |
| 4,265,200 | 5/1981 | Wessel et al. . |
| 4,416,232 | 11/1983 | Shiozaki et al. ............ 123/357 |
| 4,594,979 | 6/1986 | Yasuhara ..................... 123/357 |
| 5,183,019 | 2/1993 | Suhara . |
| 5,261,378 | 11/1993 | Fenchel et al. ............. 123/357 |

FOREIGN PATENT DOCUMENTS

| | | |
|---|---|---|
| 89308946 | 4/1990 | European Pat. Off. . |
| 26 53 046 | 5/1978 | Germany . |

Primary Examiner—Thomas N. Moulis
Attorney, Agent, or Firm—Kenyon & Kenyon

[57] ABSTRACT

In a device and a process for controlling an injection actuator of a self-igniting internal combustion engine, on the basis of the operating conditions, a fuel amount signal (QKO) can be given, which depends at least on the driver's command. Under certain operating conditions, regardless of the driver's command, a minimum amount is injected to actuate the injection actuator.

13 Claims, 2 Drawing Sheets

PROCESS AND DEVICE FOR CONTROLLING AN INJECTION ACTUATOR

FIELD OF THE INVENTION

The present invention relates to a process and a device for controlling an injection actuator.

BACKGROUND INFORMATION

German patent application No. 26 53 046 (corresponding to U.S. Pat. No. 4,265,200), discloses a process and a device for controlling an injection actuator in a diesel engine.

Injection actuators are also being used in newer injection systems with distributor injection pumps, where essential injection parameters, such as injection start and injection end, can be controlled by using a solenoid valve to influence the start of delivery and/or the delivery rate.

The injection actuator is usually actuated in the "advance" direction by applying pressure to the injection actuator piston. In the "retard" direction, the actuator is actuated by removing pressure via a backflow valve or a backflow throttle. Although the removal of pressure alone allows this retard adjustment, the required restoring force is applied both through a restoring spring and hydraulic forces acting on the actuator piston during injection.

If the vehicle is decelerating, normally no injection takes place and the restoring force component of the injection is no longer needed. Under such operating conditions, the only restoring force applied is that of the restoring spring, which may not be exerted in certain operating ranges. As a result, the injection actuator remains in an incorrect position in those operating ranges. However, intolerable combustion conditions do not occur because no injection takes place.

Since the setpoint and actual positions of the injection actuator are being monitored, error messages indicating a permanent deviation may result. This results in an entry in the system error memory. During servicing, such an entry can lead to unnecessary repair or replacement of the pump. When deceleration ends, an erroneous injection start takes place for a certain number of injections, which may result in smoke release.

SUMMARY OF THE INVENTION

The process and a device for controlling an injection actuator according to the present invention avoids the above-described problems, in particular, unnecessary error messages and erroneous injection starts that occur after deceleration during injection restart.

An advantage of the process according to the present invention is that it is possible to avoid unnecessary error messages and erroneous adjustments of the injection actuator at the end of deceleration.

DETAILED DESCRIPTION OF THE INVENTION

Figure 1:
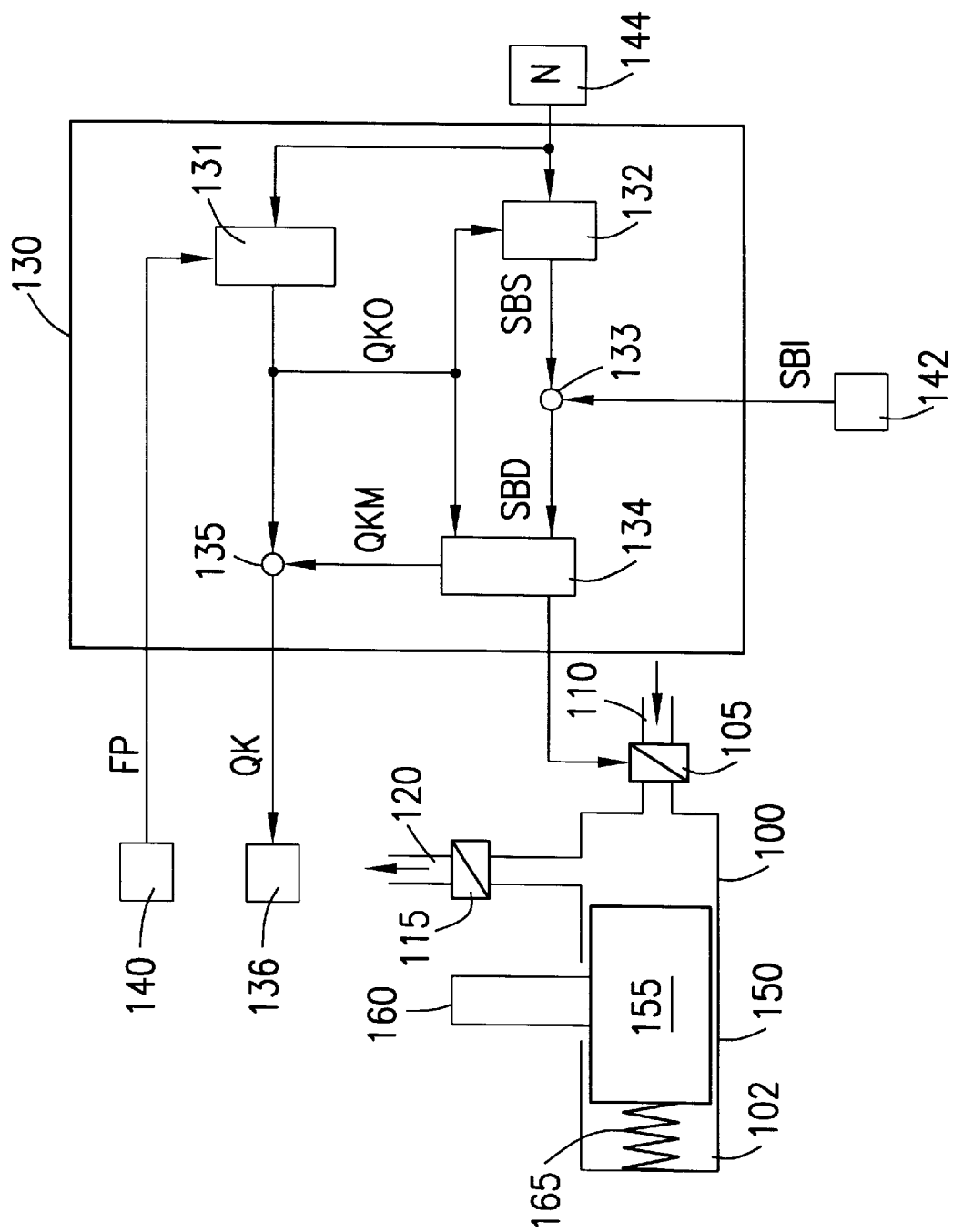
FIG. 1 shows an exemplary embodiment of a block diagram of a device according to the present invention.

FIG. 1 schematically shows an exemplary device according to the present invention with reference to a block diagram. Injection actuator 100 is of the type normally used for adjusting the delivery start in distributor injection pumps. A delivery line 110 is enabled or closed using a delivery valve 105. A return flow line 120 is also connected to the injection actuator 100 via a return flow valve 115.

Controller 130 sends trigger signals to additional actuator means 136, such as, for example, a fuel amount actuator. Controller 130 processes a plurality of output signals from a plurality of sensors 140. These may include, for example, means 140 for generating a driver command signal FP, a sensor 142 for detecting an actual value SBI, which provides the actual injection start and/or the actual position of the injection actuator, and/or a sensor 144 for detecting an engine speed signal N.

The controller comprises a fuel amount generator 131, which, in addition to other values not illustrated, receives the driver command signal FP and the engine speed N. The fuel amount generator 131 provides fuel amount signal QK0.

A setpoint generator 132 is also provided, which, in addition to other values not illustrated, receives the fuel amount signal QK0 and the engine speed N. Setpoint generator 132 provides a setpoint SBS for controlling the injection actuator 100.

At node 133 setpoint value SBS and actual value SBI are compared. An injection actuator controller 134 receives the output of node 133, the system deviation SBD, as well as the fuel amount signal QK0. Injection actuator control 134 sends trigger signals to return flow valve 115 and feed valve 105. Furthermore, injection actuator control 134 sends a minimum fuel amount signal QKM to node 135. Output signal QK0 of fuel amount generator 131 is applied to the second input of node 135. Fuel amount actuator 136 receives the output of node 135.

The injection actuator comprises, for example, an actuator arm 160, which engages the roller ring of the distributor injection pump. Actuator arm 160 is coupled to an injection actuator piston 155. Injection actuator piston 155 is mounted in a guide cylinder 150 and encloses, with its one end face, a spring area 102. In spring area 102 there is a restoring spring 165 supported between injection actuator piston 155 and guide cylinder 150. The feed line 110 and the return line 120 end on the other side of the injection actuator piston 155.

The device according to the present invention operates as follows. The fuel amount generator 131 computes fuel amount signal QK0 from at least one driver command signal FP and/or further operating parameters such as, for example, engine speed signal N. This fuel amount signal QK0 is sent to actuator 136 to inject the predefined amount of fuel into the internal combustion engine.

The setpoint generator 132 computes setpoint SBS from operating parameters such as, for example, at least the fuel amount signal QK1 and the engine speed signal N. This setpoint is compared with actual value SBI in node 133, and the system deviation SBD is formed. On the basis of this system deviation SBD, injection actuator control 134 controls valves 105 and 115.

If the injection start is to be "advanced," the injection actuator piston 155 must be displaced to the left. This is achieved by controlling valve 115 so that it closes and controlling valve 105 so that it opens. As a result, pressure is applied to injection actuator piston 155, spring 165 is compressed, and the piston moves to the left.

When the injection start is to be "retarded" based on the operating conditions, valve 105 is closed and valve 115 is opened. This causes the pressure to be removed from the injection actuator piston 155, which moves to the right under the action of the spring 165, "retarding" the injection start.

The arrangement of valves 115 and 105 is chosen as an example only. Other arrangements can also be provided, in particular, 3-way valves can be used or only one feed valve and one return flow throttle can be used. Furthermore, it is even conceivable that the "advance" and "retard" adjustments can be switched around.

A problem occurs when the pressure is removed from the injection actuator piston 155. The force of spring 165 does not work under all operating conditions to move the injection actuator piston 155 to the "retard" position to the right. If injections occur, an additional force component supporting the action of spring 165 acts on the roller ring and actuator arm 160. If this additional force is missing, for example, as in deceleration when no injections occur, the spring force does not work under all operating conditions to "retard" the injection actuator piston.

Figure 2:
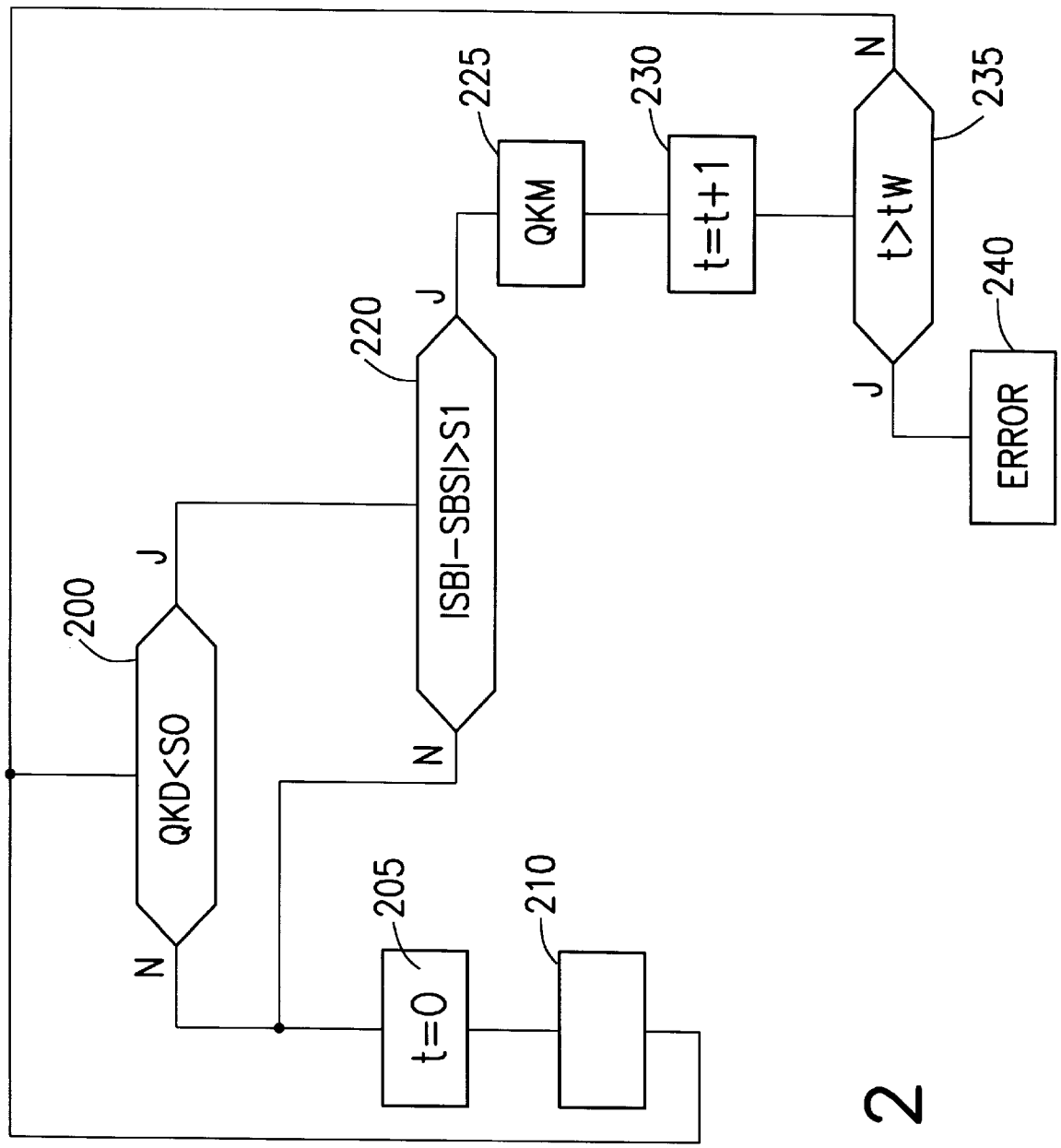
FIG. 2 shows an exemplary embodiment of a flow chart of a process according to the present invention.

The procedure according to the present invention, illustrated in FIG. 2, eliminates this shortcoming. The first query 200 determines whether the force of restoring spring 165 is insufficient to "retard" the injection actuator.

The sufficiency of the force is determined by checking, for example, whether the vehicle is in deceleration. In the embodiment illustrated, this is determined by checking whether the amount of fuel QK0 to be injected is less than a threshold value S0. In alternative embodiments the sufficiency of the force of the restoring spring 165 may be determined using other parameters. Deceleration can also be detected using other parameters.

If this is not the case, i.e., if the injection amount is greater, a time counter t is reset to zero in step 205. Then, in block 210, the normal program sequence is executed. In another embodiment, query 200 may check whether the injection amount QK0 is equal to zero.

If query 200 detects that the vehicle is in deceleration, or a condition exists where the force of the restoring spring alone is insufficient, query 220 follows. Query 220 checks whether the absolute value of the system deviation SBD, the absolute value of the difference between the actual value SBI and the setpoint SBS for the injection start, is greater than a threshold value S1.

If the system deviation SBD is not greater than the threshold value S1, step 205 follows. If the system deviation of the injection actuator circuit is greater than a threshold value S1, then a minimum fuel amount QKM is given in step 225 and superimposed, preferably additively, on the output signal of fuel amount generator 131 at node 135. The additional injected minimum fuel amount QKM is selected so that it is sufficient to exert a restoring force on injection actuator piston 155 via the roller ring, which is sufficient to reset it to the "retard" position. On the other hand, the minimum fuel amount QKM is selected to be so small that it has a negligible effect on driving comfort and emissions.

The minimum fuel amount QKM is only injected if the absolute value of the difference SBD between setpoint SBS and actual value SBI is greater than the threshold value S1. This exemplary embodiment according to the present invention has the advantage that additional injection occurs only if it is necessary to move the injection actuator.

In a subsequent step 230, a time counter t is incremented. Query 235 checks whether a time threshold tw has been exceeded. If this is the case, an error is detected in step 240. An error is detected if the absolute value of the difference between setpoint SBS and actual value SBI is larger than the amount by which time tw exceeds the threshold value S1.

An error is detected if, despite additional injections, a permanent system deviation persists. Otherwise the program is restarted with step 200. The necessary error detection is ensured through this measure.

In a simplified embodiment according to the present invention, query 220 can be omitted. In this embodiment, an additional injection of the minimum fuel amount QKM takes place whenever the fuel amount QK0 requested by the driver becomes zero and/or less than a value S0, which is insufficient to move the actuator. This embodiment is, for example, less costly.

In the procedure according to the present invention, deceleration is selected by comparison with an applicable threshold fuel amount. If deceleration is detected, a minimum amount QKM, which produces the necessary force on the injection actuator piston 155, is cyclically injected into each cylinder regardless of the driver's command. These individual injections have no effect on emissions.

Even during deceleration, both force components for restoring the injection actuator piston are activated through the injections that take place.

What is claimed is:

1. A process for controlling an injection actuator of a self-igniting internal combustion engine, the process comprising the steps of:

determining a fuel amount signal as a function of at least one operating parameter and at least one driver command; and injecting, under predetermined operating conditions, a minimum fuel amount to actuate the injection actuator regardless of the at least one driver command.

2. The process according to claim 1, wherein the minimum fuel amount is injected when the fuel amount signal is less than a first threshold value.

3. The process according to claim 1, wherein the minimum fuel amount is injected during a deceleration condition.

4. The process according to claim 1, wherein the minimum fuel amount is injected if the fuel amount signal has a zero value.

5. The process according to claim 1, wherein the minimum fuel amount is only injected if an absolute value of a difference between a setpoint and an actual value for an injection actuator control is greater than a second threshold value.

6. The process according to claim 1, wherein the injection of the minimum fuel amount actuates the injection actuator to a retard position.

7. The process according to claim 5, wherein the absolute value of the difference between the setpoint and the actual value for injection actuator control is larger than an amount by which a waiting time exceeds the second threshold value.

8. A device for controlling an injection actuator of a self-igniting internal combustion engine comprising:

a fuel amount generator producing a fuel amount signal as a function of at least one operating parameter and at least one driver command; and an injection actuator control receiving the fuel amount signal from the fuel amount generator, the injection actuator control, under predetermined operating conditions and without regard to the at least one driver command, injecting a minimum fuel amount to adjust the injection actuator.

9. The device according to claim 8, wherein at least one sensor is coupled to each of the fuel amount generator and the injector actuator control.

10. The device according to claim 9, wherein one of the at least one sensors detects an engine speed signal.

11. The device according to claim 9, wherein one of the at least one sensors detects an actual value of one of an injection start and an injection actuator position.

12. The device according to claim 9, wherein one of the at least one sensors generates the at least one driver command.

13. The device according to claim 8, further comprising a setpoint generator coupled to the injector actuator control, the setpoint generator computing a setpoint value as a function of at least the fuel amount signal and an engine speed signal.

* * * * *